Figure 1:
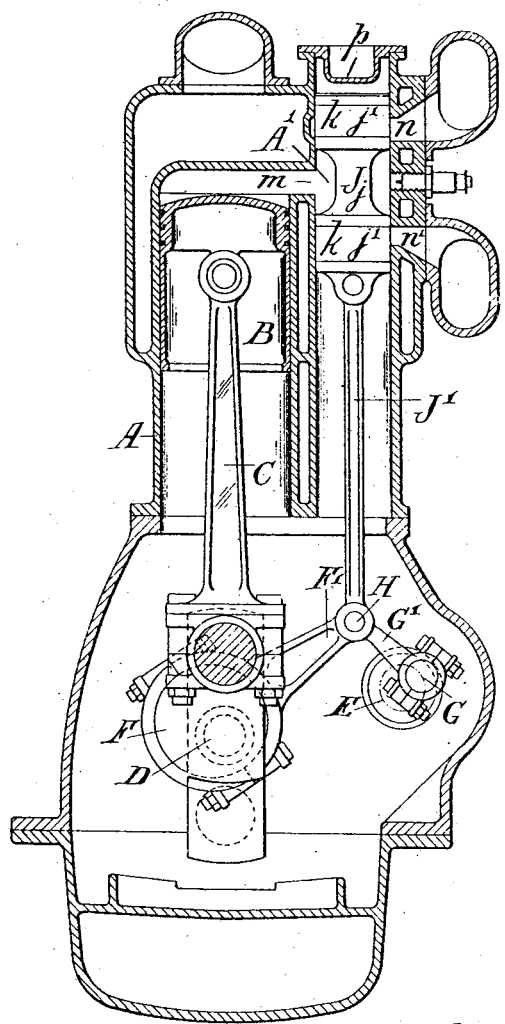

A. A. REMINGTON & A. J. ROWLEDGE.
VALVE GEAR OF INTERNAL COMBUSTION ENGINES.
APPLICATION FILED JULY 8, 1911.

1,120,240.

Patented Dec. 8, 1914.
3 SHEETS—SHEET 1.

Witnesses:
Anthony F. Greene
E. L. Brown

Inventors:
Alfred Arnold Remington
Arthur John Rowledge
By Edmund Cayser Brown
Attorneys A. A. REMINGTON & A. J. ROWLEDGE.
VALVE GEAR OF INTERNAL COMBUSTION ENGINES.
APPLICATION FILED JULY 8, 1911.

1,120,240.

Patented Dec. 8, 1914.

3 SHEETS—SHEET 2.

UNITED STATES PATENT OFFICE.

ALFRED ARNOLD REMINGTON AND ARTHUR JOHN ROWLEDGE, OF BIRMINGHAM, ENGLAND, ASSIGNORS TO THE WOLSELEY TOOL AND MOTOR CAR COMPANY, LIMITED, OF BIRMINGHAM, ENGLAND.

VALVE-GEAR OF INTERNAL-COMBUSTION ENGINES.

1,120,240.     Specification of Letters Patent.     Patented Dec. 8, 1914.

Application filed July 8, 1911. Serial No. 637,475.

*To all whom it may concern:*

Be it known that we, ALFRED ARNOLD REMINGTON and ARTHUR JOHN ROWLEDGE, both subjects of the King of Great Britain, and both residing at Birmingham, in the county of Warwick, England, and respectively designer and chief draftsman, have invented certain new and useful Improvements in Valve-Gear of Internal-Combustion Engines, of which the following is a specification.

This invention relates to valve mechanism of the type in which a piston valve or slide valve which controls the admission and exhaust into and from the cylinder of a four-stroke cycle internal combustion engine is operated through the medium of two eccentrics or cranks, or of an eccentric and crank, one of which rotates at the same speed as the engine and the other at half the speed, the valve having imparted thereto a movement which is compounded of the movements of the two eccentrics, or the eccentric and crank and has for its object improvements in the invention described and claimed in Letters Patent of the United States No. 970,525, granted September 20, 1910, to George Hutchinson Mann.

According to the present invention, an eccentric rod or link is connected at one end with an eccentric or crank-pin of a shaft which travels at half the speed of the engine shaft, and is connected at its outer or vibrating end with an eccentric rod or link which is connected at its other end with an eccentric or crank-pin of a shaft which revolves at the same speed as the engine, and which is conveniently itself the engine shaft, and such eccentric rods or links, or eccentric rod and link, form together a toggle and this toggle is connected either at the joint between the two rods or links or rod and link, or near to such joint, directly with a link through the medium of which the toggle imparts movement to the valve, and the longitudinal axis of the link through which the movement of the toggle is imparted to the valve is under all movements of the toggle at one side only of the center of the eccentric or crank-pin which revolves at the engine speed.

The effect of the operation of the mechanism, when the eccentrics or crank-pins, or eccentric and crank-pin, thereof are properly adjusted as to their relative angular positions, is to cause the point of connection between the two eccentric rods or links, or eccentric rod and link, to travel in a path which somewhat resembles the figure 8, the line of movement which commences about the middle of the compression stroke, or earlier during such stroke, and continues to about the middle of the explosion stroke, being approximately at right-angles to the middle position of the vibrations of the valve rod, thus insuring that the valve will be substantially stationary in its position closing the cylinder to both the inlet and exhaust, the line of travel then turning rapidly in a direction to insure the opening of the exhaust, then turning rapidly in a direction to close the exhaust and, continuing in such direction, rapidly crossing the line first above-mentioned and quickly opening the inlet, and then turning rapidly and closing the inlet, and joining, by a quick turn, into the commencement of the line first above-mentioned, thus completing the cycle. The invention, therefore, enables the time of opening and closing, of both induction and exhaust, to substantially coincide with the time that usually obtains in internal combustion engines which are fitted with ordinary puppet valves, and enables the advantages to be secured which are incidental to the employment of puppet valves with the advantages which are incidental to the use of a piston or slide valve.

Figure 2:
Figure 3:
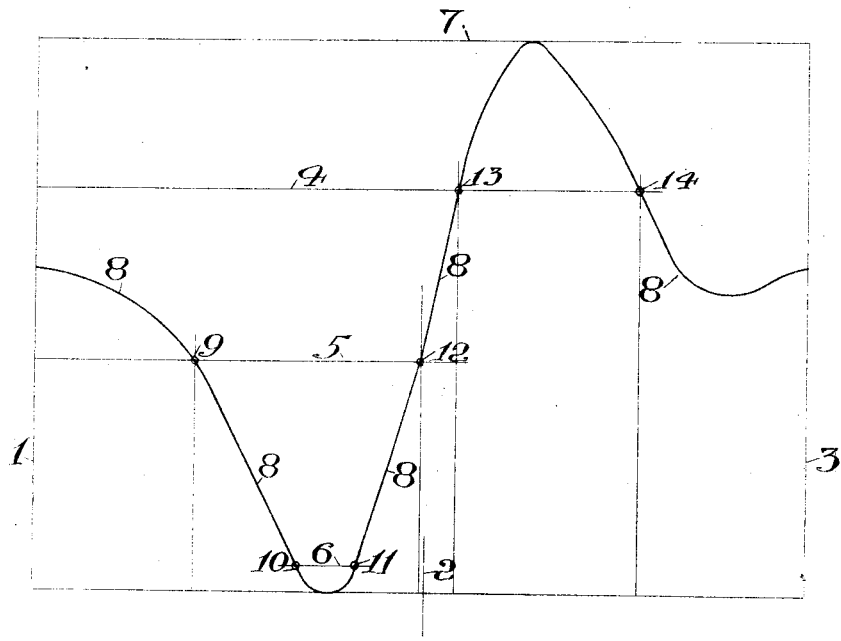

Figure 1 illustrates, chiefly in vertical section, a convenient practical form of the invention, which is illustrated by way of example applied to an engine having a piston valve. Fig. 2 shows, in diagrammatic form, the operation of the mechanism through a complete cycle of the engine. Fig. 3 is a diagram, to a greater scale vertically than horizontally shown as spread out on a flat surface which indicates lengthwise a complete engine cycle, and indicates by an irregular curved line the operation of the valve in controlling the inlet and exhaust and in keeping the same closed. Fig.

Figure 5:
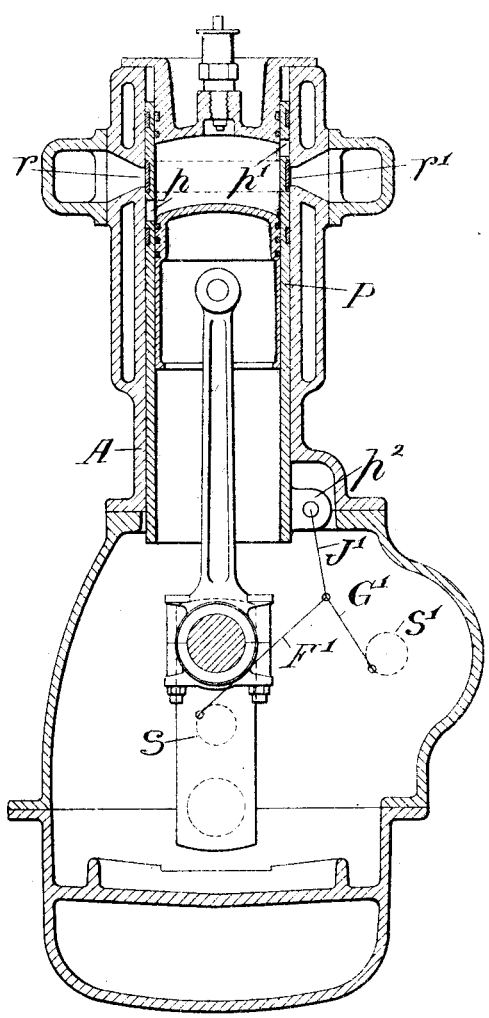

4 is a polar diagram, showing the points of opening and closing of the valve, both for induction and exhaust, for a complete cycle of the engine and the relative widths of opening at different points; and, Fig. 5 is a corresponding view to Fig. 1, illustrating the invention as applied to an engine having a sleeve valve.

Referring first to Fig. 1, A is the cylinder, B the piston, C the connecting-rod, D the crank-shaft of the engine, E the half-speed shaft, F an eccentric carried by the shaft D, G a crank-pin of the shaft E, F' an eccentric-rod of the eccentric F, and G' a link which is connected with the crank-pin G. The rod F' and the link G' are connected together at H, forming a toggle-joint. J is a piston valve and J' a valve rod which connects the toggle joint, formed by the rod F' and the link G', with the valve J. The particular valve illustrated is of a duplex piston type having a middle portion $j$ of reduced diameter and the ends $j'$ of a diameter to fit within the cylindrical valve chest A', and these ends are provided with piston rings $k$. The inlet port $n$ for combustible mixture, and the exhaust port $n'$, are alternately put into communication with the valve port $m$ by the movements of the valve J, and the annular space, within the valve chest A', which surrounds the portion of reduced diameter $j$ of the valve, is constantly in communication with the port $m$. The port $n$ is placed in communication with the port $m$ by the upward or outward movement of the valve, and the port $n'$ is put into communication with the port $m$ by the downward or inward movement of the valve. The bung $p$ of the valve chest cover is within a hollow of the valve when the valve is in its upward or outward position.

Referring now to Fig. 2, the circle $F^2$ indicates the revolution of the eccentric F, and the circle $G^2$ indicates the revolution of the crank-pin G. M is a vertical line through the center of the crank-shaft. The line K indicates the position of the crank when the induction opens, and the broken line $F^3$ indicates the eccentric rod F' when the crank is in such position. The line K' indicates the position of the crank when the induction closes, and the broken line $F^4$ indicates the eccentric-rod F' when the crank is in such position. The crank then travels around during the compression and explosion until it reaches the position indicated by the line $K^2$, when the exhaust opens, and the line $F^5$ indicates the eccentric-rod F' when the crank is in such position. The line $K^3$ indicates the position of the crank when the exhaust closes, and the line $F^6$ indicates the eccentric-rod F' when the crank is in such position. It will be remembered that the shaft E travels at half the speed of the shaft D.

The shaft D revolves in the direction of the arrow $a$, Fig. 2, and the shaft E revolves in the opposite direction, as indicated by the arrow $a'$ of such figure. The broken line $G^3$ indicates the rod G' when the induction opens, the crank-pin G being then in the angular position shown at E'. The broken line $G^4$ indicates the rod G' when the induction closes, the crank-pin G being then in the angular position indicated at $E^2$. The line $G^5$ indicates the rod G' when the exhaust opens, the crank-pin G being then in the position indicated at $E^3$; and the line $G^6$ indicates the rod G' when the exhaust closes, the crank-pin G being then in the position indicated at $E^4$. The movements of the toggle-joint are indicated by the diagram N, which roughly corresponds with the figure 8, the direction of movement at different points thereof being indicated by arrow heads. The induction opens when the toggle-joint is in the position $b$, the movement then being rapidly upward and fully opening the valve. The line of movement then curves over, and following a somewhat quickly descending curve $b'$, the valve is closed quickly at the point $b^2$, and, continuing in substantially the same curve, the valve is rapidly brought to about its mid-position, when the line of movement of the toggle-joint quickly curves inward, and runs in a substantially horizontal direction along the line $b^3$ keeping the valve substantially stationary in its mid-position. The line then curves quickly downward and inclines inward to the point $b^4$, at which point the valve rapidly opens to the exhaust and the movement continues, in an inclined direction, downward along the line $b^5$, and then rapidly turning upward along the substantially vertical line $b^6$ reaches the point $b^7$, when the exhaust closes, and then continues rapidly upward along the line $b^8$ until it reaches the point $b$, thus completing the cycle.

Referring now to Fig. 3, the vertical line 1 indicates the commencement of the ignition and exhaust revolution, the vertical line 2 indicates the termination of such revolution, and the vertical line 3 indicates the termination of the induction and compression revolution. The space between the horizontal lines 4 and 5 indicates the zone within which both the induction and exhaust remain closed, the space between the lines 5 and 6 indicates the zone of exhaust port opening, and the space between the lines 7 and 4 indicates the zone of induction port opening. The irregular line 8 indicates the path of the valve in relation to the complete cycle of the engine. At the point 9 where the line 8 first crosses the line 5, the exhaust commences to open, and at the point 10 where the curved line 8 first crosses the line 6 the exhaust is fully open, and the exhaust remains fully open while the line 8 passes down below the line 6 and until it crosses such line again at the point 11. The exhaust port then commences to close, and is completely closed at the point 12 where the line 8 again crosses the line 5, and remains closed up to the point 13 where the line 8 first crosses the line 4. The further upward movement opens the induction port, and this port remains open while the line 8 continues above the line 4 and then descends again to the point 14 where it again crosses the line 4, at which point the induction port closes. The line 8 then continues downward within the zone between the lines 4 and 5, and rises again within such zone until it joins into the commencement of the line 8, the cycle being thus complete. The passing of the line 8 below the line 6 indicates that the valve over-opens the exhaust port, whereby a longer duration of full-port opening is obtained than would be the case if the valve traveled sufficiently only to fully open the port.

Figure 4:
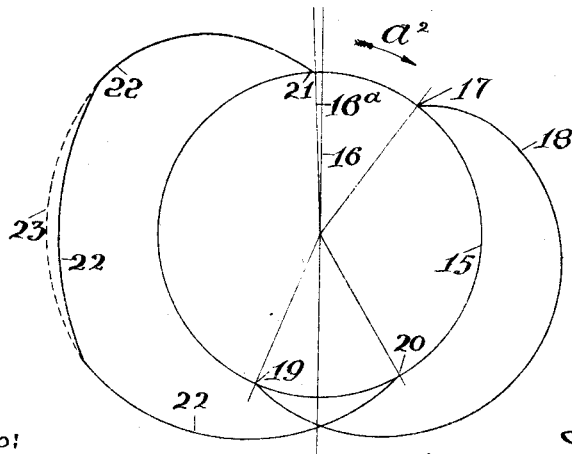

Referring now to Fig. 4, the circle 15 represents a circle of revolution of the engine. Line 16 is vertical through the center of the circle 15, and the line 16$^a$ indicates the position of the crank when the piston is in its position at the point when the exhaust closes. The engine revolves in the direction of the arrow $a^2$. The induction commences to open at the point 17, and opening quickly, as indicated by the curved line 18, remains open until it closes again at the point 19. The valve then remains closed from the point 19 during the compression and explosion up to the point 20, when the exhaust opens and remains open up to the point 21, where it closes. The exhaust opening is indicated by the line 22, showing that while the exhaust opens somewhat gradually, it closes rapidly, and remains substantially fully open for a very large proportion of time between its opening and closing. The space between the line 22 and a broken curved line 23, indicates the travel (referred to in describing Fig. 3) of the valve to a distance beyond what is necessary to fully open the port. It is not essential that the two shafts revolve in opposite directions.

Referring now to Fig. 5, which illustrates the application of the invention to the sleeve type of slide valve, P is the sleeve valve having a port $p$ which registers with the inlet port $r$ of the cylinder A, and a port $p'$ which registers with the exhaust port $r'$ of the cylinder, the valve when in its mid-position of course closing both the cylinder ports. The particular valve shown is given simply by way of example. The broken line circle $s$ indicates the circle of revolution of the eccentric F shown by Fig. 1, and the broken line circle $s'$ indicates the circle of revolution of the crank-pin G shown by such figure. The lines F' and G' indicate, respectively, an eccentric-rod and link corresponding, respectively, to the rod F' and link G' shown by Fig. 1. The toggle-joint formed by the rod F' and link G' is connected by a link J' with a lug $p^2$ of the valve.

Having fully described our invention, what we claim and desire to secure by Letters Patent, is:—

1. In an internal combustion engine, a slide valve for controlling both the admission of combustible mixture to the cylinder and the exhaust therefrom, toggle mechanism consisting of two toggle links which are pivoted directly together at their inner ends and are journaled at their outer ends, respectively, eccentrically with a shaft which revolves at engine speed and a shaft which revolves at half engine speed, and a link which connects between the toggle mechanism and the valve, and the longitudinal axis of said link which connects between the toggle mechanism and the valve being under all movements of the toggle mechanism at one side only of the center of the journal of the shaft which revolves at engine speed which constitutes the journal for the outer end of one of the toggle links, substantially as set forth.

2. In an internal combustion engine, a slide valve for controlling both the admission of combustible mixture to the cylinder and the exhaust therefrom, toggle mechanism consisting of two toggle links which are pivoted directly together at their inner ends and are journaled at their outer ends, respectively, eccentrically with a shaft which revolves at engine speed and a shaft which revolves at half engine speed, and a link which connects between the point of the connection of the toggle links with one another and the valve, and the longitudinal axis of said link which connects between the toggle mechanism and the valve being under all movements of the toggle mechanism at one side only of the center of the journal of the shaft which revolves at engine speed which constitutes the journal for the outer end of one of the toggle links, substantially as set forth.

3. In an internal combustion engine, a slide valve for controlling both the admission of combustible mixture to the cylinder and the exhaust therefrom, a rod F' operated by an eccentric F of the engine shaft, a link G' operated by a crank-pin G of the half speed shaft E, the links F' and G' being jointed directly together to form a toggle, a rod J' connected at one end with the valve and at its other end with the point of connection of the toggle links with one another, the longitudinal axis of said rod being under all movements of the toggle at one side only of the center of the said eccentric, substantially as described.

In witness whereof we have hereunto signed our names this 27th day of June 1911, in the presence of two subscribing witnesses.

ALFRED ARNOLD REMINGTON.
ARTHUR JOHN ROWLEDGE.

Witnesses:
  ALEXIS JACOB,
  ROBERT G. GROVES.